Oct. 21, 1924.　　　　　　　　　　　　　　　　1,512,493
J. L. SHROYER
BROILER
Filed Nov. 13, 1923　　　2 Sheets-Sheet 2

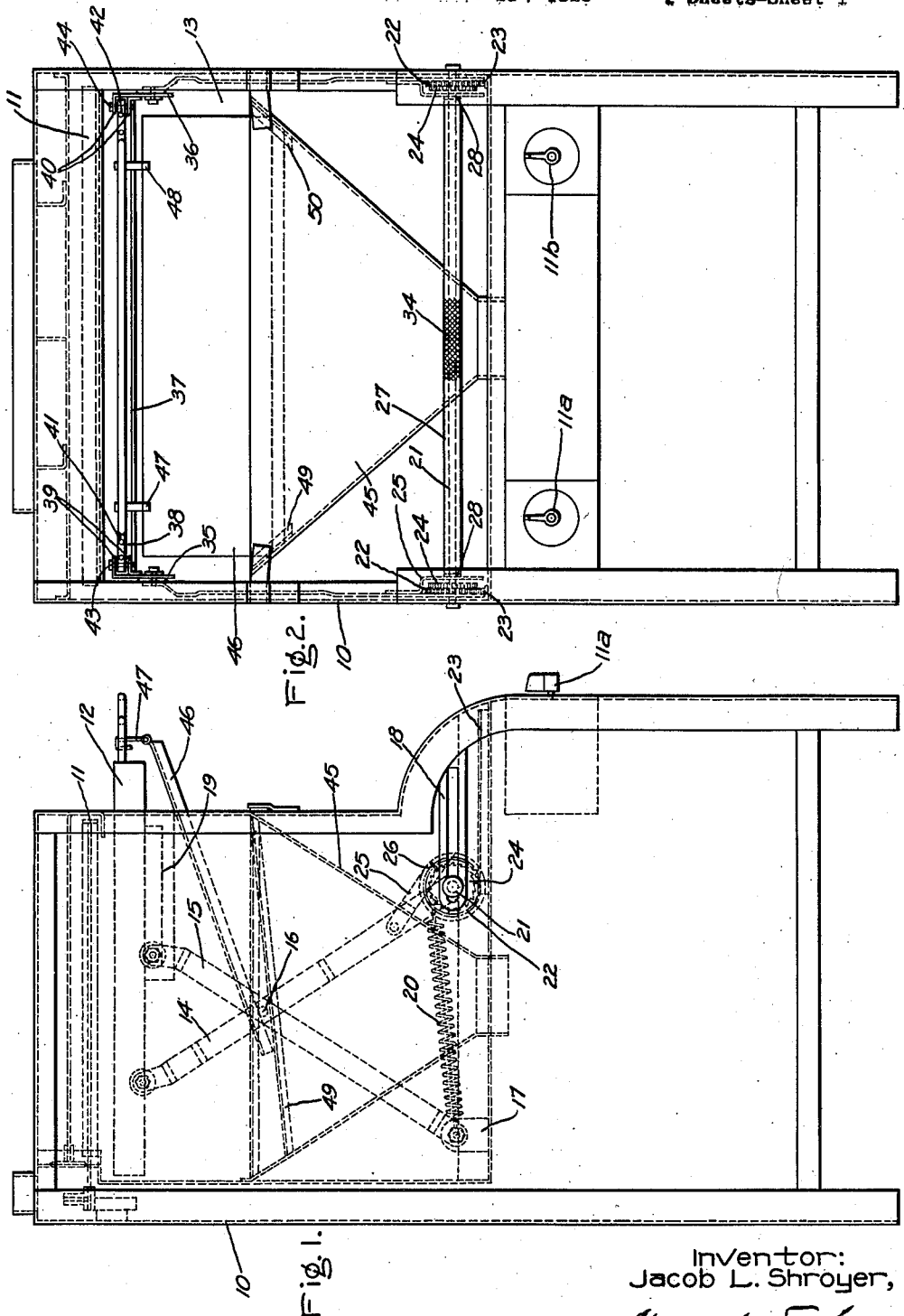

Inventor:
Jacob L. Shroyer,
by
His Attorney.

Patented Oct. 21, 1924.

1,512,493

UNITED STATES PATENT OFFICE.

JACOB L. SHROYER, OF CHICAGO, ILLINOIS, ASSIGNOR TO EDISON ELECTRIC APPLIANCE COMPANY, INC., OF CHICAGO, ILLINOIS, A CORPORATION OF NEW YORK.

BROILER.

Application filed November 13, 1923. Serial No. 674,556.

*To all whom it may concern:*

Be it known that I, JACOB L. SHROYER, a citizen of the United States, residing at Chicago, in the county of Cook, State of Illinois, have invented certain new and useful Improvements in Broilers, of which the following is a specification.

My invention relates to broilers and the like, and has for its object the provision of means whereby the grid or other support for the food may be easily and quickly adjusted with relation to the source of heat and securely held in adjusted position.

In carrying out my invention, I provide lazy tongs supports of well known form for the grid. In one form of my invention, the adjusting members of the lazy tongs supports are pivotally mounted on a rod which is moved laterally in adjusting the grid and held against rotation by suitable latching means to secure the grid in adjusted position.

Figure 3:
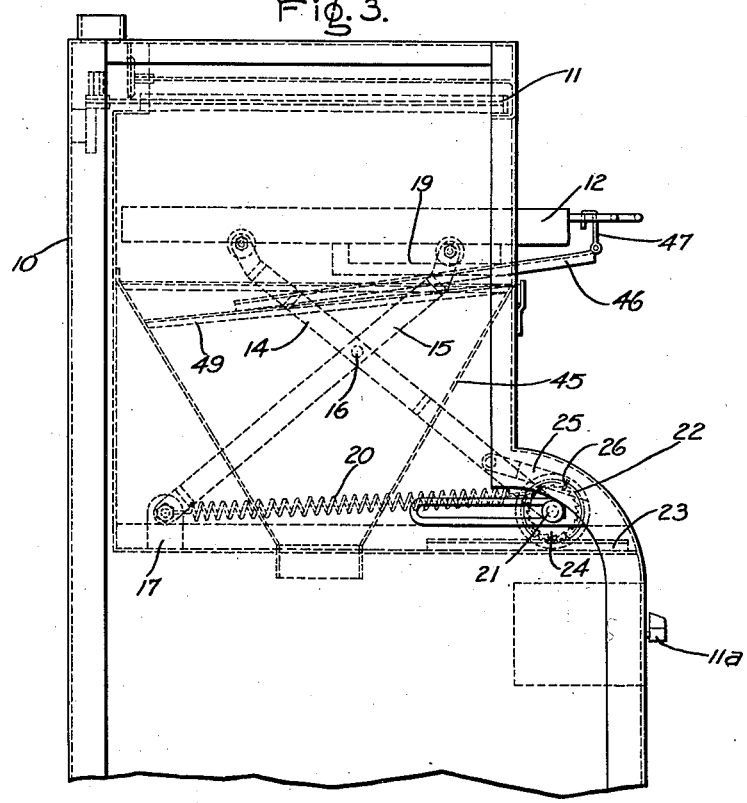
Figure 4:
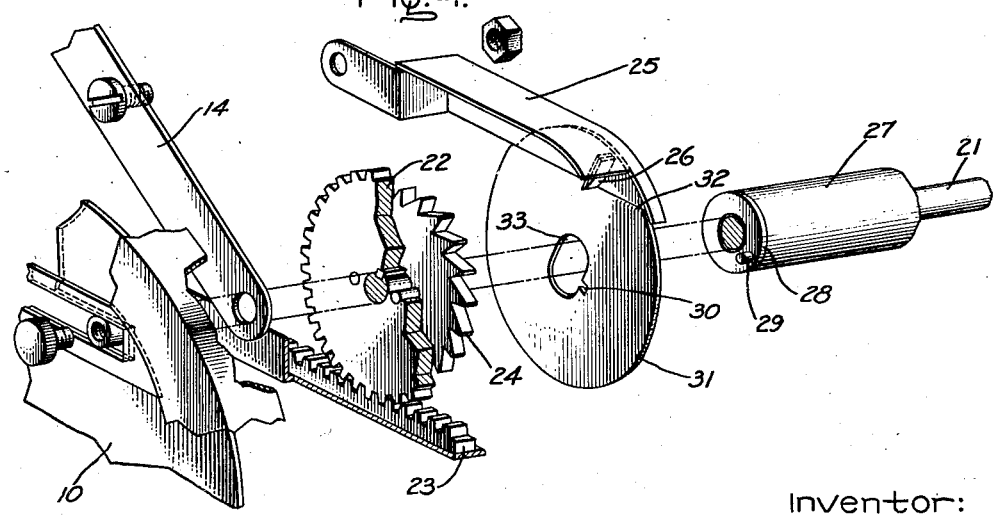

For a more complete understanding of my invention, reference should be had to the accompanying drawings, in which Fig. 1 is a side elevation view of a broiler embodying my invention; Fig. 2 is a front elevation view of the broiler shown in Fig. 1; Fig. 3 is a fragmentary side elevation view similar to Fig. 1 but showing the food support in lowered position; while Fig. 4 is an exploded view in perspective showing details of the operating mechanism.

Referring to the drawings, I have shown my invention in one form as applied to a large capacity broiler such as used in hotels and restaurants. The broiler comprises an inclosing metallic casing and supporting frame 10 forming an open front chamber near the top of which is mounted a suitable source of heat 11, shown as an electric heating unit. Control switches 11a and 11b are provided for the heating unit. Obviously, however, any suitable source of heat may be used. The heating unit 11 is mounted in a horizontal position and beneath the heating unit is an adjustable support 12 for the food to be cooked, the food being placed on the support through the large opening 13 in the front of the broiler. The support 12 is carried at each side on a lazy tongs support of well known form, (Fig. 1) comprising arms 14 and 15 pivoting together at point 16. The upper end of arm 14 is pivotally secured to the cooking support 12 near the rearward or left hand end of the support while the lower end of arm 15 is pivotally secured to a bracket 17 mounted on the supporting frame 10. The other ends of arms 14 and 15 are slidably secured to the frame 10 and the support 12 respectively so as to be movable with relation thereto in a horizontal direction, suitable guides 18 and 19 being provided. Preferably a roller is provided on the movable end of arm 15 to permit its moving freely in guide 19. It will be understood that cooking support 12 is carried on two pairs of lazy tongs supports arranged at each side, as previously described.

As thus arranged, it will be observed that by moving the lower or movable end of each arm 14 inward or outward along its guide 18 the cooking support 12 can be raised or lowered as desired. A spring 20 is provided for each lazy tongs support. This spring is secured at one end to the bracket 17 and at the other to the lower end of arm 14, whereby the lower end of the arm is pulled inward with a force sufficient to counterbalance in part the weight of the support 12. To provide for quickly raising and lowering the cooking support and for latching it in adjusted position, a rod 21 (Figs. 2 and 4) is provided extending across the open front of the broiler and slidably mounted in the guides 18, the lower end of arms 14 being pivotally mounted on this rod. Secured to rod 21 near each end is a spur gear 22 which meshes with a horizontal rack 23 secured to the broiler frame. A ratchet 24 is also secured to rod 21 near each end, and pivotally mounted on each arm 14 near its lower end is a latching member 25 which is provided with a projection 26 cooperating with the teeth of the ratchet 24, adjacent thereto. For releasing the latching member 25, a pipe or tubular operating member 27 is slipped over the rod 21 and held concentric but rotatable with relation thereto by means of a supporting washer 28 at each end. The washers 28 are secured to the pipe 27 so as to be rotated therewith and are each provided with a longitudinally projecting pin 29 arranged to cooperate with a centrally located notch 30 in a latch-releasing member 31. These latch-releasing members are disc-like in shape and are each provided with a portion or segment at the top which is struck to one side so as to form a ledge 32 on which the latching arm 25 rests. An oblong central aperture 33 is provided in each member 31 through which rod 21 extends. It will thus be observed that by rotating pipe 27 upward toward the rear or in a counter-clockwise direction as viewed in Fig. 4, the latch-releasing member 31 at each end will be carried upward by pins 29, the releasing members 31 having this freedom with relation to rod 21 by virtue of the oblong aperture 33 in each. The releasing members will carry with them the latching members 25 whereby the ratchets 24 are released.

As thus constructed and arranged the operation of the broiler mechanism is as follows: Assuming the food support 12 in its lowered position as shown in Fig. 3, in order to raise it and bring the food in the proper cooking relation with the source of heat, the operating member 27 will be grasped and pushed inward until the cooking support has been elevated to the desired position in which position it will be locked by the latching members 25. It will be observed that when the support is raised the latching members 25 slip over the ratchets. When it is desired to lower the cooking support to adjust it or to remove the food, the operating member 27 will be first turned slightly upward toward the rear to raise the latching members 25 out of engagement with the ratchets, then pulled outward until the cooking support has been lowered to the desired position after which member 27 will be turned downward slightly so that the members 25 can fall into locking engagement with the ratchets 24. Preferably the operating member 27 is provided with a knurled central portion 34 to facilitate its being turned. The adjustment of the cooking support is facilitated by the springs 20 which counteract the weight of the support to a large degree.

In raising and lowering the cooking support the rod 21, together with the lower ends of arms 14, is thus given motion of translation toward the front or rear of the broiler as the case may be. At the same time the rod 21 is caused to rotate due to the cooperation of gears 22 at its ends with the racks 23. The weight of the cooking support tends to move the rod 21 toward the front of the broiler and thereby tends to rotate it in a clockwise direction as viewed in Fig. 1. The function of the members 25 is to lock the rod 21 against rotation in a clockwise direction and thus hold the cooking support in adjusted position.

It will be observed that by means of the lazy tongs connections, the support 12 is always maintained horizontal from the front to the rear. Since it is impossible to move rod 21 inward or outward faster at one end than at the other, due to the gear and rack mechanism, at each end, the lower ends of arms 14 will be moved inward and outward together and therefore the sides of the cooking support will be raised or lowered at the same rate. The cooking support is thus maintained in a true horizontal position.

The cooking support 12 is shown as comprising side bars 35 and 36 (Fig. 2) to which the lazy tongs elevating supports are connected. These side bars are secured together by bars 37 extending across the broiler, and act as supports for a broiler grid 38 which is slidably mounted on them. Pairs of spaced flanges 39 and 40 are provided on the bars 35 and 36 respectively to act as supports and guides for the sides of the grid. The grid comprises a rectangular frame 41, provided with parallel spaced supporting bars 42 extending from the front to the back. Pins 43 and 44 are provided in the flanges interlinking with the frame of the grid so as to prevent its being pulled inadvertently completely out of its support, although after removing the pins, the grid may be removed for cleaning, repairs, etc.

A pyramidal shaped hopper 45 is mounted below the food support 12 to catch the drippings. A drip pan 46 is also provided having one end pivotally attached to the outer end of the grid by means of hinged straps 47 and 48 and the other end emptying into the hopper. The inner end of the drip pan rests on inclined flanges 49 and 50 secured to the sides of the hopper. As the grid is pulled out to inspect or receive the food, the drip pan is carried with it, the inner end of the drip pan sliding on the flanges 49 and 50. It will be understood that a suitable receptacle will be placed under the hopper.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. The combination with a cooking grid, of a plurality of pairs of pivotally connected arms forming supports for the grid, a rod forming a pivot for an arm of each pair and movable laterally to adjust the grid, means for causing rotation of said rod when the grid is adjusted, and latching means for holding the rod against rotation to secure the grid in adjusted position.

2. The combination with a cooking grid, of lazy tongs supports for the grid, a rod forming a pivot for a member of each of said lazy tongs supports, guides for said rod whereby the rod may be moved laterally to adjust the position of the grid, means for causing rotation of said rod when the grid is adjusted, and releasable latching means for holding said rod against rotation to secure the grid in adjusted position.

3. The combination with a cooking grid, of lazy tongs supports for the grid, a transverse rod forming a pivot for a member of each of said lazy tongs supports, supporting guides for said rod whereby the rod may be moved laterally to adjust the position of the grid, gear racks adjacent the ends of said rod, spur gears fixed to said rod meshing with said racks whereby said rod is rotated when moved to adjust the grid, and releasable latching means for preventing rotation of said rod to secure the grid in adjusted position.

4. The combination with a cooking grid, of lazy tongs supports for the grid, a transverse rod forming a pivot for a member of each of said lazy tongs supports, supporting guides for said rod whereby the rod may be moved laterally to adjust the position of the grid, gear racks adjacent the ends of said rod, spur gears fixed to said rod meshing with said racks whereby said rod is rotated when the grid is adjusted, latching means for preventing rotation of said rod to secure the grid in adjusted position, and a tubular member carried by said rod and rotatable with relation thereto to release said latching means.

5. The combination with a cooking grid, of a plurality of pairs of pivotally connected arms forming supports for the grid, a rod forming a pivot for an arm of each pair, supporting guides for said rod whereby the rod may be moved laterally to adjust the position of the grid, gear racks adjacent the ends of said rod, spur gears fixed to said rod meshing with said racks, whereby said rod is rotated when the grid is adjusted, a ratchet carried by said rod, a latch carried on one of said arms normally cooperating with said ratchet to secure the grid in adjusted position, a tubular member enclosing said rod and rotatably mounted thereon, and means actuated by rotation of said tubular member for releasing said latch.

6. The combination with a cooking grid, of a plurality of pairs of pivotally connected arms forming supports for the grid, a rod forming a pivot for an arm of each pair and movable laterally to adjust the grid, stationary racks adjacent the ends of said rod, and gears secured to said rod meshing with said racks whereby the ends of said rod are constrained to move together so that the grid is adjusted uniformly, and means for securing the grid in adjusted position.

In witness whereof, I have hereunto set my hand this 8th day of Nov., 1923.

JACOB L. SHROYER.